United States Patent
Bogdan et al.

(10) Patent No.: US 7,150,550 B2
(45) Date of Patent: Dec. 19, 2006

(54) AUTOMOTIVE MAP POCKET HAVING AN ELECTROLUMINESCENT LAMP AND METHOD OF MAKING THE SAME

(75) Inventors: Radu Bogdan, Dearborn, MI (US); Alan G Dry, Grosse Point Woods, MI (US)

(73) Assignee: Lear Corporation, Southfield, MI (US)

( * ) Notice: Subject to any disclaimer, the term of this patent is extended or adjusted under 35 U.S.C. 154(b) by 133 days.

(21) Appl. No.: 10/711,636

(22) Filed: Sep. 29, 2004
(Under 37 CFR 1.47)

(65) Prior Publication Data
US 2006/0067083 A1    Mar. 30, 2006

(51) Int. Cl.
*B60Q 3/00* (2006.01)

(52) U.S. Cl. .......................... 362/501; 362/84; 362/154

(58) Field of Classification Search ................. 362/84, 362/488, 154, 489, 501; 296/146.7, 37.13
See application file for complete search history.

(56) References Cited

U.S. PATENT DOCUMENTS

| | | | |
|---|---|---|---|
| 2,851,585 A | 9/1958 | Glowzinski | 240/2 |
| 4,104,555 A | 8/1978 | Fleming | |
| 4,602,358 A | 7/1986 | Sato | |
| 4,619,624 A | 10/1986 | Kerr, III et al. | |
| 4,670,819 A | 6/1987 | Boerema et al. | |
| 5,064,974 A | 11/1991 | Vigneau et al. | |
| 5,193,895 A * | 3/1993 | Naruke et al. | 362/501 |
| 5,434,013 A | 7/1995 | Fernandez | |
| 5,434,757 A | 7/1995 | Kashiwagi | |
| 5,452,190 A | 9/1995 | Priesemuth | |
| 5,780,965 A | 7/1998 | Cass et al. | 313/506 |
| 5,811,930 A | 9/1998 | Krafcik et al. | |
| 6,000,822 A | 12/1999 | Polizzi et al. | 362/488 |
| 6,013,956 A | 1/2000 | Anderson, Jr. | 307/10.1 |
| 6,116,672 A | 9/2000 | Cannon et al. | 296/37.13 |
| 6,139,304 A | 10/2000 | Centofante | |
| 6,160,475 A | 12/2000 | Hornung et al. | |
| 6,193,399 B1 | 2/2001 | Hulse | 362/511 |
| 6,196,606 B1 | 3/2001 | McGoldrick | 296/37.13 |
| 6,217,201 B1 | 4/2001 | Hulse | 362/511 |
| 6,286,983 B1 | 9/2001 | Macher et al. | |

(Continued)

FOREIGN PATENT DOCUMENTS

DE    4141297    6/1993

(Continued)

OTHER PUBLICATIONS

Examiner Michael A. Friedhofer, *Office Action mailed* Dec. 23, 2005, U.S. Appl. No. 10/711,385.

(Continued)

*Primary Examiner*—Stephen F Husar
(74) *Attorney, Agent, or Firm*—Wood, Herron & Evans, L.L.P.

(57) ABSTRACT

An automotive interior trim assembly having a map pocket with an electroluminescent lamp. The trim assembly comprises a trim panel and a housing that forms at least a portion of the map pocket. The housing is coupled to the trim panel to define a cavity having an opening for accessing the cavity. An electroluminescent lamp is integrally molded to the housing to illuminate the cavity. An injection molding process may be used to form the housing with the electroluminescent lamp as an insert in the mold cavity. The housing is then coupled to the trim panel to form a map pocket in the trim assembly. The housing may be configured as a map pocket closeout or a map pocket insert.

16 Claims, 4 Drawing Sheets

U.S. PATENT DOCUMENTS

| | | | |
|---|---|---|---|
| 6,315,436 B1 | 11/2001 | Schenk et al. | |
| 6,419,379 B1 | 7/2002 | Hulse | 362/488 |
| 6,464,381 B1 | 10/2002 | Anderson, Jr. et al. | 362/488 |
| 6,536,825 B1 | 3/2003 | McAndrew et al. | |
| 6,536,928 B1 | 3/2003 | Hein et al. | 362/464 |
| 6,594,417 B1 | 7/2003 | Hulse | 385/31 |
| 6,652,128 B1 | 11/2003 | Misaras | 362/488 |
| 6,656,397 B1 | 12/2003 | Hansen et al. | 264/45.4 |
| 6,746,067 B1 | 6/2004 | Schmidt et al. | |
| 6,945,581 B1 | 9/2005 | Taylor | |
| 2001/0030871 A1 | 10/2001 | Anderson, Jr. et al. | 362/488 |
| 2001/0052715 A1 | 12/2001 | McAndrew et al. | |
| 2001/0053082 A1 | 12/2001 | Chipalkatti et al. | 362/496 |
| 2003/0002273 A1 | 1/2003 | Anderson, Jr. et al. | 362/84 |
| 2004/0017687 A1 | 1/2004 | Misaras | 362/489 |
| 2004/0108606 A1 | 6/2004 | Goggins | |
| 2005/0140167 A1 | 6/2005 | Jaggi | |

FOREIGN PATENT DOCUMENTS

| | | |
|---|---|---|
| DE | 195 18 169 | 11/1996 |
| DE | 29719025 | 12/1997 |
| DE | 298 08 949 | 7/1998 |
| DE | 19910973 | 10/2000 |
| DE | 10129021 | 2/2001 |
| DE | 10151704 | 5/2003 |
| DE | 10338898 | 8/2003 |
| DE | 102 40 270 | 3/2004 |
| DE | 10335868 | 3/2005 |
| DE | 202005009668 | 6/2005 |
| EP | 1188615 | 6/2002 |
| EP | 1298007 | 4/2003 |
| EP | 1 110 822 | 7/2004 |
| FR | 2838669 | 10/2003 |
| JP | 57194126 | 11/1982 |
| JP | 09086273 | 3/1997 |
| JP | 9097026 | 4/1997 |
| JP | 11162633 | 6/1999 |
| JP | 2000344011 | 12/2000 |
| JP | 2002046529 | 2/2002 |
| JP | 2003086354 | 3/2003 |
| WO | 98/57097 | 12/1998 |
| WO | 01/63172 | 8/2001 |
| WO | 03/101779 | 12/2003 |

OTHER PUBLICATIONS

Examiner Colin Thompson, *Combined Search and Examination Report under Sections 17 and 18(3)*, The UK Patent Office.

Examiner Peter Gardiner, *Combined Search and Examination Report under Sections 17 and 18(3)*, The UK Patent Office.

Examiner Monty Siddique, *Combined Search and Examination Report Under Section 17 and 18(3)*, The UK Patent Office.

Examiner Dipl.-Ing. Hezel, *Office Action*, (No translation is available to Applicant.).

Examiner Renee Luebke, *Office Action*, mailed Jan. 19, 2006 for U.S. Appl. No. 10/711,462.

Examiner Peter Easterfield, *Combined Search and Examination Report Under Sections 17 and 18(3)*, The UK Patent Office.

Examiner Colin Thompson, *Combined Search and Examination Report Under Sections 17 and 18(3)*, The UK Patent Office.

Examiner Robert Mirams, Combined Search and Examination Report Under Sections 17 and 18(3), The UK Patent Office.

Ward, John Anthony (Examiner), USPTO, Office Action mailed May 9, 2006, in related U.S. Appl. No. 11/711,462.

Author Unknown, German Office Action, dated May 5, 2006, 3 pages.

Dipl-ing. Ropling; Office Action; May 18, 2006; 4 pages; Deutsxhes Patent- und Markenarnt.

\* cited by examiner

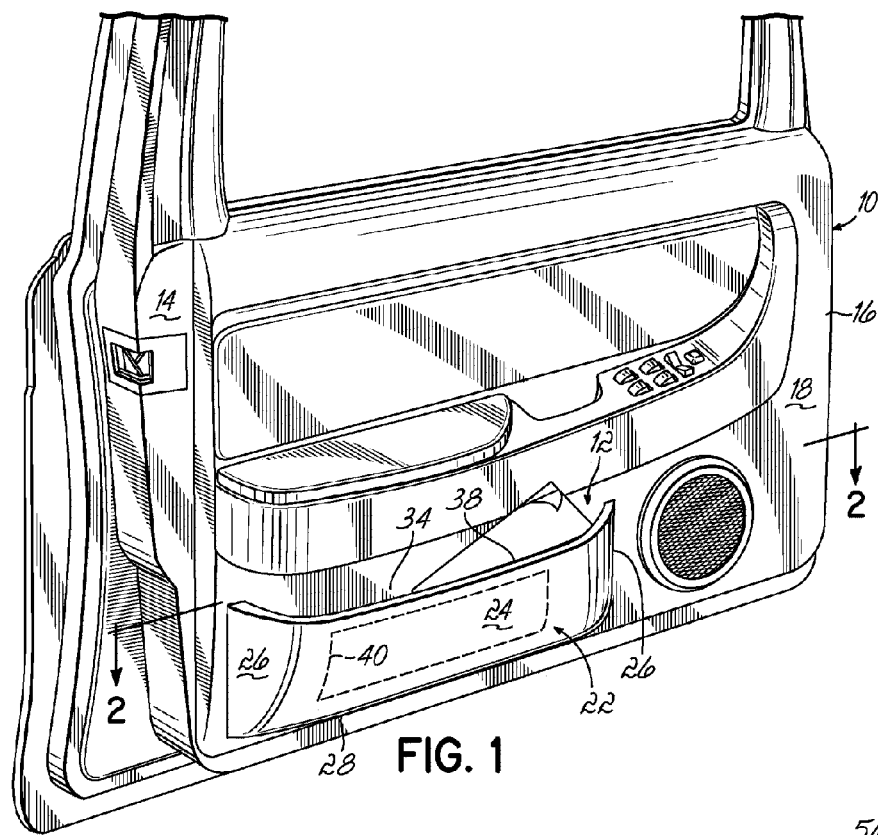
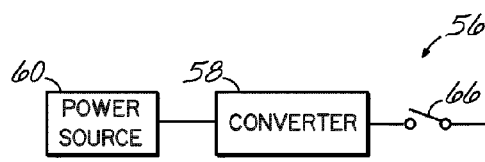
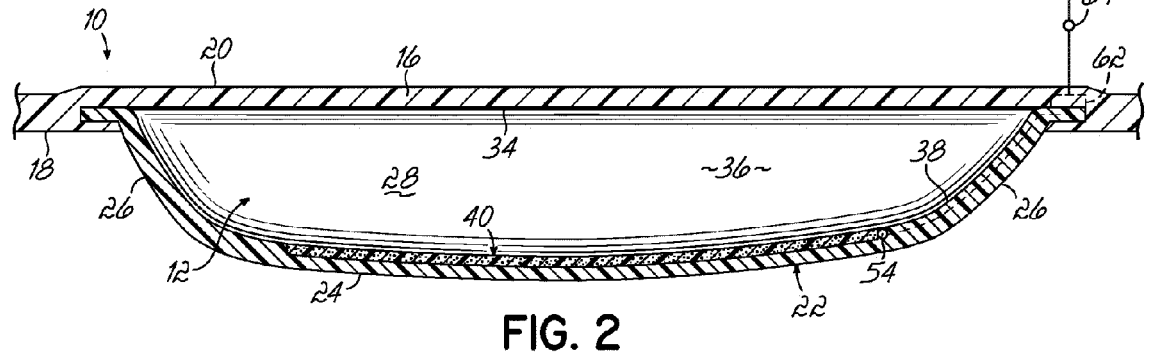
FIG. 1
FIG. 2

AUTOMOTIVE MAP POCKET HAVING AN ELECTROLUMINESCENT LAMP AND METHOD OF MAKING THE SAME

CROSS-REFERENCE

The present invention is related to U.S. Ser. No. 10/711,652, filed Sep. 29, 2004, U.S. Ser. No. 10/711,480, filed Sep. 21, 2004, U.S. Ser. No. 10/711,462, filed Sep. 20, 2004, U.S. Ser. No. 10/711,385, filed Sep. 15, 2004 and U.S. Ser. No. 10/711,463, filed Sep. 20, 2004.

FIELD OF THE INVENTION

The present invention pertains generally to automotive interiors and more particularly to map pockets for automotive interiors.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include the instrument panels, armrests, door trim panels and consoles. In many of these trim assemblies, various storage compartments are incorporated therein that allow the vehicle occupant to conveniently store one or more items, such as tissue, coins, maps, pens, paper, and other items typically carried in a vehicle. One such compartment is the open-ended map pocket typically carried in the lower portion of the door trim assembly.

Moreover, in more luxury-oriented vehicles, manufacturers may provide various lighting systems positioned at convenient locations inside the vehicle cabin. The lighting systems are used to illuminate one or more portions of the vehicle interior at strategic times. For instance, a lighting system may be provided with the map pocket so that the various items contained therein may readily be seen during night time conditions or other conditions when the map pocket contents may not be readily observed. In this way, the map pocket contents may be observed and accessed without turning on overhead lighting that may disturb other vehicle occupants or temporarily blind the driver.

While being desired by car owners and vehicle occupants, map pockets incorporating a lighting system have some drawbacks. A primary drawback is in the manufacturing and assembly of the various parts that make up the map pocket lighting system. For example, conventional lighting systems include a separate light assembly installed on the door trim panel above the map pocket compartment. In this way, the light assembly emits light that illuminates the interior of the map pocket. The light assembly typically includes multiple parts such as an incandescent light bulb, a bulb mounting structure, a light cover, light reflectors and heat stake bosses to manage the heat generated by the incandescent bulb. The light assembly may further include contact switches so that the light bulb can be selectively activated such as when the headlights are on or the inside dome light is turned on.

Thus, under current manufacturing processes, map pockets having a lighting system provided therewith comprise numerous parts each having different part numbers that must all be appropriately supplied, tracked, shipped, inventoried and eventually assembled to make the complete product. Multiple part assemblies in turn lead to significant administrative costs and labor costs, which increase the overall costs of production.

There is a need for an improved automotive map pocket having a lighting system and a method for making the same that reduces the number of parts and reduces the labor required for assembly thereof, thereby reducing overall manufacturing costs.

SUMMARY OF THE INVENTION

The present invention provides for an interior trim assembly including an automotive map pocket with a lighting system having a reduced number of parts that can be made in an efficient and cost effective manner. To this end, the interior trim assembly includes a trim panel, such as a door trim panel, and a housing coupled to the trim panel which forms at least a portion of the map pocket to define a cavity having an opening. The cavity is adapted to store one or more items therein which may be accessed through the opening by a vehicle occupant. Additionally, an electroluminescent lamp is integrally molded with the housing and adapted to selectively illuminate the cavity so that its contents may be readily observed. In one embodiment, the housing is configured as a map pocket closeout, which is coupled to either the front or back surface of the trim panel to collectively form the map pocket. In another embodiment, the housing is configured as a map pocket insert, which is received in an opening of the trim panel to form the map pocket.

The housing used to form the map pocket and which has the electroluminescent lamp incorporated therein may advantageously be formed through an injection molding process. In one embodiment, the electroluminescent lamp is inserted into a mold and a mold chamber is formed about at least a portion of the electroluminescent lamp. A molten polymer resin is injected into the mold chamber to form the housing. During the molding of the housing, the electroluminescent lamp is coupled thereto. The housing having the electroluminescent lamp incorporated therein may then be coupled to the trim panel. The trim assembly may then be subsequently installed into the interior of an automobile.

By virtue of the foregoing, there is thus provided an improved interior trim assembly including a map pocket with a lighting system having a reduced number of parts and which may be made in a cost effective manner.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a perspective view of an automotive door trim assembly including an embodiment of the map pocket of the present invention;

FIG. 2 is a detailed partial cross-sectional view of the door trim assembly of FIG. 1 generally taken along line 2—2;

DETAILED DESCRIPTION

Figure 3:
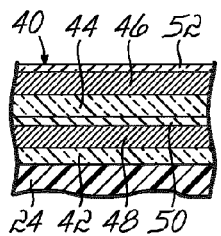
FIG. 3 is a detailed partial cross-sectional view of the electroluminescent lamp shown in FIG. 2.

In FIG. 1, there is shown an interior trim assembly, in the form of a door trim assembly 10 for an automobile (not shown), including an embodiment of the automotive map pocket 12 of the present invention incorporated within door trim assembly 10. The door trim assembly 10 covers a portion of the interior of the automobile door 14 to provide a more aesthetically pleasing environment, as well as additional comfort to the vehicle's occupants. Other various trim assemblies in the automobile, such as instrument panels, rear passenger side panels and consoles, are generally constructed in a similar fashion and may benefit from the present invention. Thus, while the following detailed description focuses on the map pocket 12 being included in a door trim assembly 10, those having ordinary skill in the art will recognize that the map pocket 12 may equally be incorporated in other automotive trim assemblies.

The door trim assembly 10 includes a trim panel 16 having a relatively rigid substrate which forms at least a portion of the structural support and defines the general shape of the door trim assembly 10. The trim panel 16 may be secured to the interior of the automobile door 14, for example, by a bracket or mounting member (not shown) as is known in the art. The door trim assembly 10 further includes a front surface 18 that faces the interior of the automobile and a back surface 20 opposite the front surface 18 that is hidden from view when the trim assembly 10 is mounted to the automobile door 14. As shown in FIG. 1, a housing, such as a map pocket closeout 22, may be coupled to trim panel 16 and cooperate with trim panel 16 to define the map pocket 12.

The map pocket closeout 22 shown in FIG. 1 is know in the art as a front load map pocket closeout, as the map pocket closeout 22 is coupled to the trim panel 16 from the front such that the map pocket closeout 22 forms a portion of the front surface 18 of the trim assembly 10 that faces the automotive interior. As shown in FIGS. 1 and 2, the map pocket closeout 22 generally includes a front wall 24, two end walls 26 coupled to opposed ends of the front wall 24, and a bottom wall 28 coupled to both the front wall 24 and end walls 26. This configuration provides for openings along the back and top of the map pocket closeout 22. Those of ordinary skill in the art will recognize that although the map pocket closeout 22 is described as having distinct walls, more or fewer walls may be used to form the map pocket closeout 22 and still be within the scope of the invention. For instance, an arcuate wall may form both the front wall 24 and the bottom wall 28. The map pocket closeout 22 is coupled to the front of trim panel 16 by known means so that a portion 34 of trim panel 16 covers or closes off the opening at the back of the map pocket closeout 22. In this way, the trim panel 16 and map pocket closeout 22 collectively define a cavity 36 having an opening 38 for gaining access to the cavity 36. The cavity 36 is adapted to store one or more items such as coins, tissue, maps, pens, paper and the like. The map pocket closeout 22 may be made from a thermoplastic material such as a thermoplastic synthetic resin.

As shown in FIG. 2, to provide lighting to the map pocket 12, an electroluminescent (EL) lamp, generally shown at 40, may be coupled to the front wall 24 of the map pocket closeout 22 and configured to illuminate the various items placed inside cavity 36. As shown in FIG. 3, the EL lamp 40 consists of a stacked structure of multiple layers carried on a suitable flexible structural substrate 42. The layered structure includes a layer of EL phosphor 44 disposed between substantially parallel front and rear electrodes 46 and 48, respectively. The phosphor layer 44 is contiguous with the front electrode 46 but spaced from, and electrically isolated from, the rear electrode 48 by a dielectric layer 50. The front electrode 46, which faces into the interior of cavity 36, is light transmissive (i.e., transparent or translucent) for transmitting light emitted from the phosphor layer 44 when an electric field is applied between the front and rear electrodes 46, 48. The dielectric layer 50 may be pigmented to supply a dark or colored background for the emitted light.

A protective encapsulation layer 52 of a light-transmissive substance, such as a polycarbonate or another polymer suitable for this application, optionally covers the front electrode 46 of the EL lamp 40. The encapsulation layer 52 may be applied to the stacked structure as a printed ink layer. An electrical connector 54, shown diagrammatically in FIG. 2, such as an edge electrical connector, includes power contacts that are coupled with the front and rear electrodes 46, 48. The power contacts of the electrical connector 54 are exposed through the encapsulation layer 52 for establishing electrical contacts.

The layers of the EL lamp 40 may be printed onto the EL substrate 42 by rotary screen printing, flexographic printing, or other printing methods using conducting, insulating and electroluminescent ink compositions. The ink compositions are printed across a desired print area on the EL substrate 42 and then dried to remove volatile solvents for forming stable layers. Some of the layers in the stacked structure may be printed more than once in order to assure proper thickness. Phosphor ink compositions are available to emit light in many colors, such as green, blue, and yellow, and may also be blended to produce white light emission. Typical EL phosphors comprise zinc sulfide-based materials doped to create the desired color emission. Suitable EL phosphor ink compositions include white, blue-green and yellow-green LUXPRINT® electroluminescent inks commercially available from DuPont Microcircuit Materials (Research Triangle Park, N.C.).

In one embodiment of the invention, a flexible metallized film may effectively function as the EL substrate 42, the rear electrode 48 and the dielectric layer 50 of the EL lamp 40. Such metallized films include a thin layer of a metallic conductive material, like aluminum, deposited on one side of a film material, like polyester. The deposited metallic layer operates as the rear electrode 48 and the film material acts as the dielectric layer 50. The metallized film also serves as an EL substrate 42 for application of the remaining printed component layers of the stacked structure.

Referring again to FIG. 2, the door trim assembly 10 further includes an electrical circuit 56, typically including an inverter or converter 58, that electrically couples a power source 60, such as the vehicle battery, with the electrical connector 54. To this end, the map pocket closeout 22 includes a first electrical connector 62, such as a pin connector, that is electrically coupled to the EL electrical connector 54. For example, the first electrical connector 62 may be positioned on the exposed edge of one of the end walls 26. Furthermore, the trim panel 16 may include a second electrical connector 64, shown diagrammatically in FIG. 2, electrically coupled to power source 60. For example, second electrical connector 64 may be positioned in trim panel 16 to which map pocket closeout 22 is to be coupled. First and second electrical connectors 62, 64 are configured such that when map pocket closeout 22 is coupled to door panel 16, the first electrical connector 62 engages, or is otherwise electrically coupled to, second electrical connector 64 so as to energize EL lamp 40. Electrical circuit 56 may further include a switch 66 for selectively energizing the EL lamp 40. For example, power to the EL lamp 40 may be switched in coordination with the operation of the headlights to the automobile so that the EL lamp 40 is energized when the headlights are on. Alternatively, the EL lamp 40 may be energized only when the interior lights are on. Additional circuitry, as recognized by persons of ordinary skill in the art, may be provided as required to ensure proper operation of the EL lamp 40.

The converter 58 electrically couples a direct current (DC) electrical system of the vehicle, such as the vehicle battery, with the electrical connector 54. The converter 58 converts the DC voltage from the electrical system to generate an alternating current (AC) driving voltage in the range of 80 to 200 VAC, preferably about 110 VAC, at a frequency in the region of 300 to 500 Hz, preferably about 400 Hz. Application of the AC driving voltage across the front and rear electrodes 46, 48 of the EL lamp 40 generates a varying electric field within the phosphor layer 44 causing the constituent phosphor particles to emit visible light. In general, the brightness of the EL lamp 40 increases with increased voltage and frequency.

The visible light emitted by the EL lamp 40 uniformly and effectively illuminates the inside of the cavity 36. The EL lamp 40 has a low power consumption and a very low heat generation as compared with conventional lamps used in such automotive applications. Furthermore, the EL lamp 40 is sturdy and exhibits excellent vibration and impact resistance. The EL lamp 40 will have a lengthy life and, as a result, will not normally need replacement over the life of the automobile, in contrast to the need to periodically replace burnt-out conventional incandescent bulbs. Moreover, the resin materials used to form map pocket closeout need not be heat resistant as the EL lamp 40 has a cooler operating temperature than conventional incandescent bulbs.

Figure 4A:
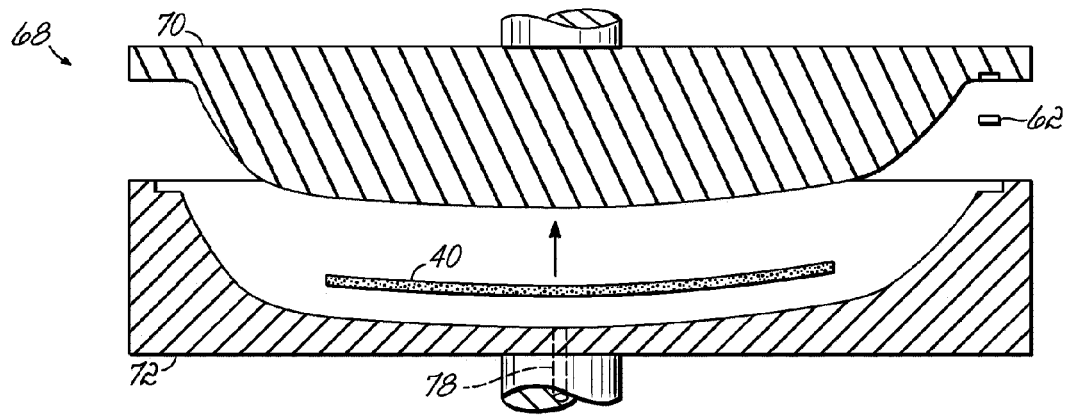
FIGS. 4A–4C are diagrammatic cross-sectional views illustrating a molding process for forming the map pocket closeout of the present invention.
Figure 4B:
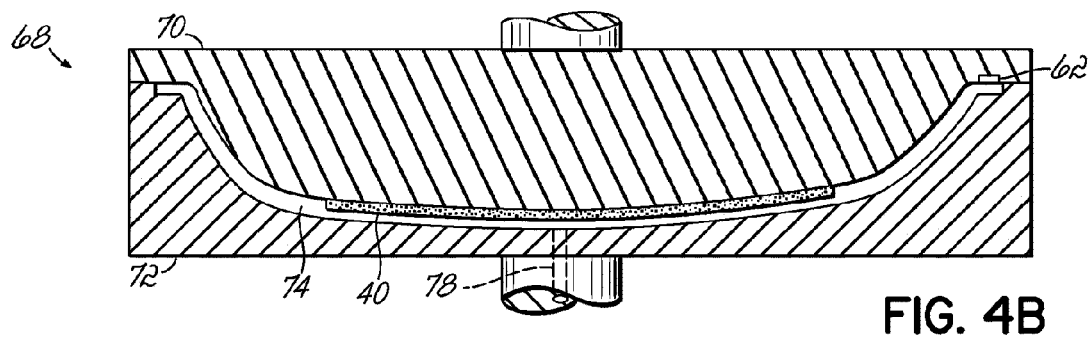
Figure 4C:
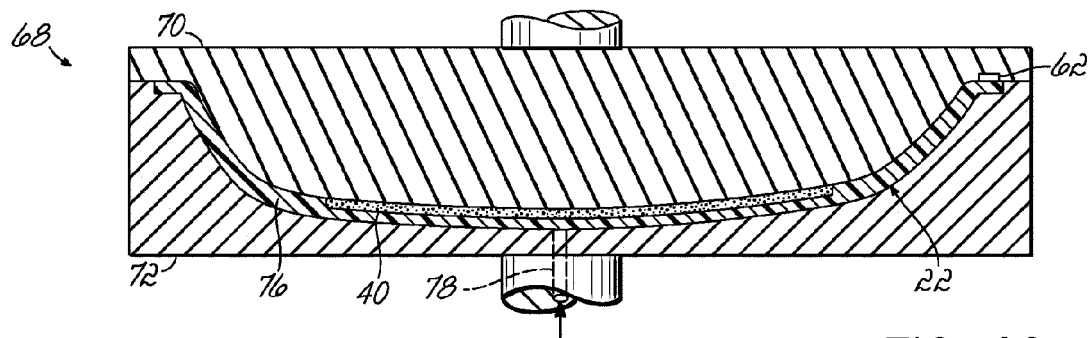

With reference to FIGS. 4A–4C, a method of making the map pocket closeout 22 of the present invention will now be described. More specifically, the map pocket closeout 22 is formed by an injection molding process in which the EL lamp 40 is integrally molded with the map pocket closeout 22 to form a unitary structure. To this end, a mold 68 is shown having first and second mold sections 70 and 72, respectively, that define a mold chamber or cavity 74 having the general three-dimensional shape of the map pocket closeout 22. The EL lamp 40 is placed at a specific location between the first and second mold sections 70, 72 and the mold 68 is closed. A molten polymer resin material 76 is then injected through a channel 78 and into the mold cavity 74. The resin material 76 is selected according to the characteristics required for the map pocket closeout 22 and may be any engineering polymer material. The injection molding process creates sufficient pressure and heat to bond the EL lamp 40 and the molten resin material 76 to form the map pocket closeout 22 and EL lamp 40 as an integral structure. Alternately, mold 68 may be configured so that the molten resin material 76 overmolds a portion of EL lamp 40, such as along its periphery, to couple the EL lamp 40 thereto. Additionally, first electrical connector 62 may be located at a specific location between first and second mold sections 70, 72 so that first electrical connector 62 is molded to the map pocket closeout 22 during the injection molding operation.

After the map pocket closeout 22 is formed and solidified, the mold 68 may be opened by separating the mold sections 70, 72 and the map pocket closeout 22 ejected therefrom. The injection molding process advantageously provides a map pocket closeout 22 with an EL lamp 40 as an integrally molded structure. The unitary map pocket closeout 22 may now be coupled to trim panel 16 of the door assembly 10 during the manufacturing process of door assembly 10.

Figure 5:
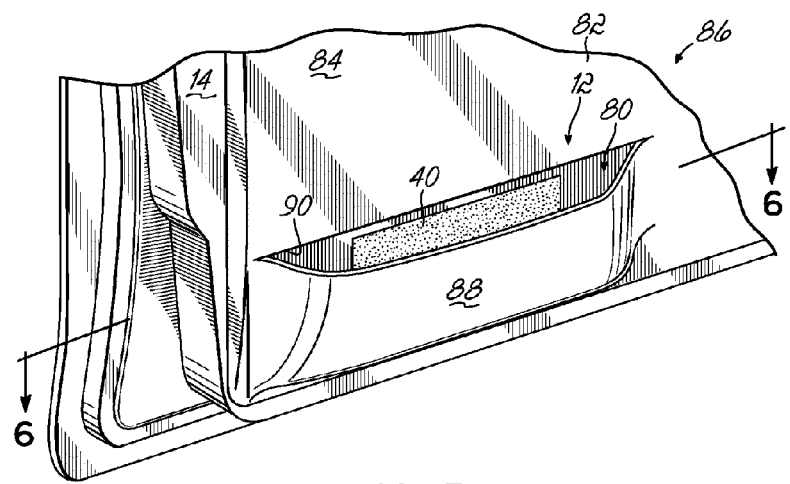
FIG. 5 is partial perspective view of an automotive trim assembly including another embodiment of the map pocket of the present invention.
Figure 6:
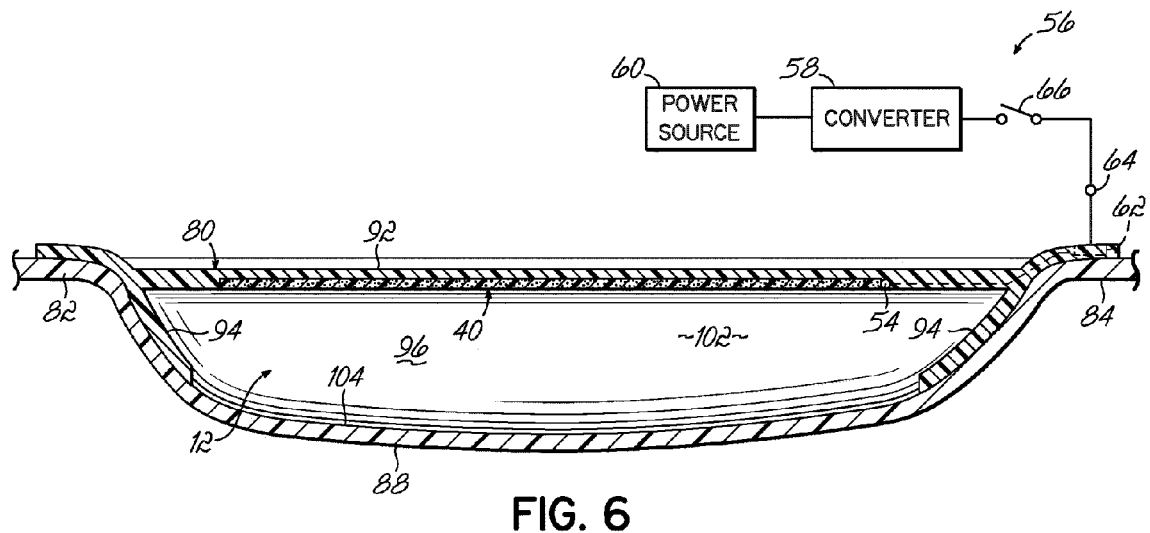
FIG. 6 is a detailed partial cross-section view of the door trim assembly of FIG. 5 generally taken along line 6—6.

In reference to FIGS. 5 and 6, in which like reference numbers refer to like features in FIGS. 1 and 2, there is shown another exemplary embodiment of the present invention with the housing configured as a rear load map pocket closeout 80. A rear load map pocket closeout 80 is coupled to the trim panel 82 from the rear so that the trim panel 82 forms a portion of the front surface 84 of the trim assembly 86 that faces the automotive interior. The trim panel 82 includes an outward portion 88 that extends away from the trim panel 82 to define an opening 90 therein. The map pocket closeout 80 generally includes a back wall 92, two end walls 94 coupled to opposed ends of the back wall 92, and a bottom wall 96 coupled to both the back wall 92 and end walls 94. This configuration provides for openings along the front and top of the map pocket closeout 80. The map pocket closeout 80 is coupled to the rear of trim panel 82 by known means so that the outward portion 88 of the trim panel 82 covers or closes off the opening at the front of the map pocket closeout 80. In this way, the trim panel 82 and map pocket closeout 80 collectively define a cavity 102 having an opening 104 for gaining access to the cavity 102. As described for the embodiment shown in FIGS. 1 and 2, the cavity 102 is adapted to store one or more items therein and the map pocket closeout 80 may be made from a thermoplastic material, such as a thermoplastic synthetic resin.

As shown in FIG. 6, the EL lamp 40 may be coupled to the back wall 92 of the map pocket closeout 80 and configured to illuminate the various items placed inside cavity 102. Moreover, the door trim assembly 86 may also include electric circuit 56, substantially similar to that described in detail above. As one or ordinary skill in the art will recognize, the map pocket closeout 80 shown in FIGS. 5 and 6 may be made by a molding process substantially similar to that described above in reference to the embodiment shown in FIGS. 1 and 2 and illustrated in FIGS. 4A–4C.

Figure 7:
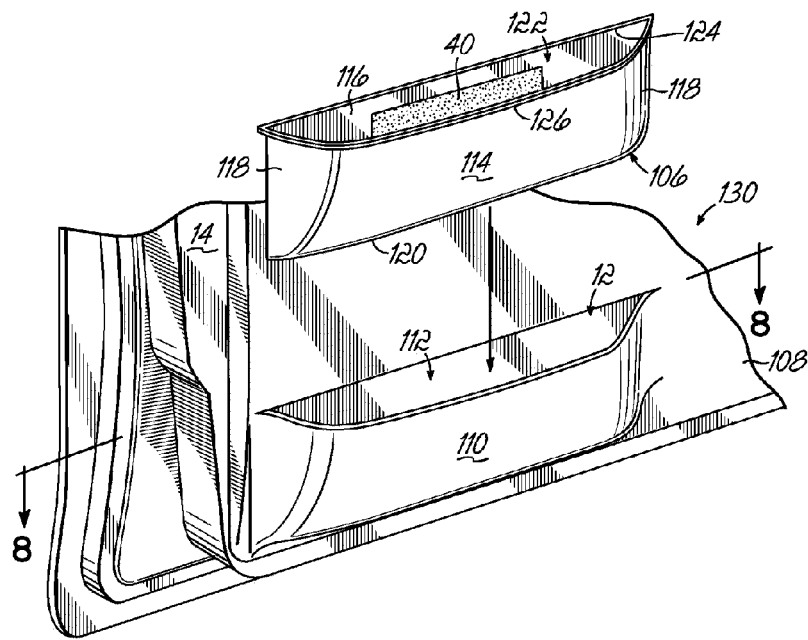
FIG. 7 is a partial perspective view of an automotive trim assembly including yet another embodiment of the map pocket of the present invention.
Figure 8:
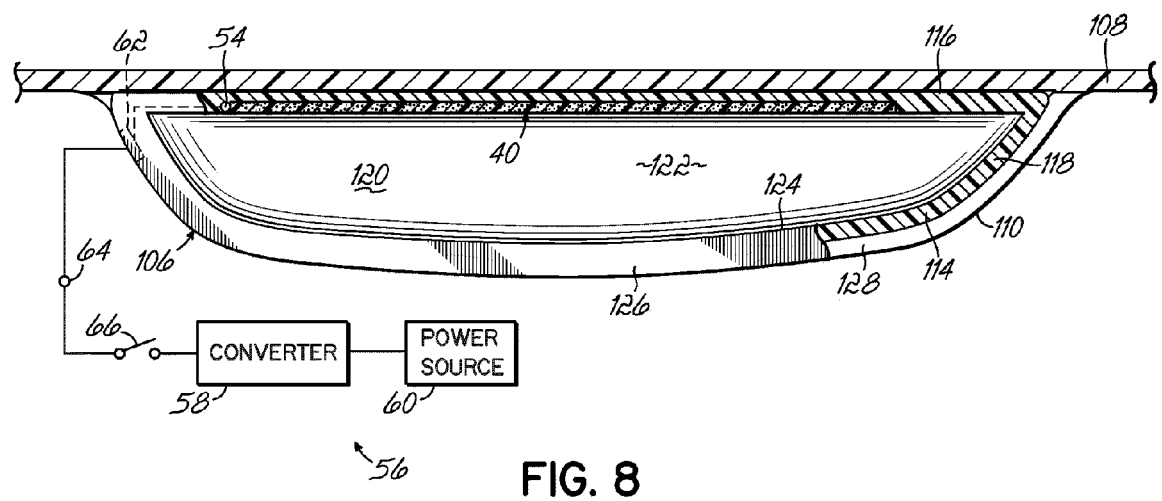
FIG. 8 is a detailed partial cross-sectional view of the door trim assembly of FIG. 7 generally taken along line 8—8 with the map pocket insert received in the trim assembly.

In reference to FIGS. 7 and 8, in which like reference numbers refer to like features in FIGS. 1 and 2, there is shown yet another embodiment of the present invention with the housing configured as a map pocket insert 106. The trim panel 108 includes an outward portion 110 that extends generally away from the trim panel 108 to define an opening 112 therein. The map pocket insert 106 generally includes a front wall 114, back wall 116, two end walls 118, and a bottom wall 120 to collectively form a cavity 122 having an opening 124 along the top of the map pocket insert 106 for gaining access to the cavity 122. The cavity 122 is adapted to store one or more items therein. The map pocket insert 106 may be coupled to the trim panel 108 by positioning map pocket insert 106 into the opening 112 in the trim panel 108. For instance, the map pocket insert 106 may include a lip 126 that engages the top edge 128 of the outward portion 110 of the trim panel 108 to couple the map pocket insert 106 thereto. The map pocket insert 106 may be made from a thermoplastic material, such as a thermoplastic synthetic resin.

As shown in FIG. 8, the EL lamp 40 may be coupled to the back wall 116 of the map pocket insert 106 and configured to illuminate the various items placed inside cavity 122. Those of ordinary skill in the art, however, will recognize that the EL lamp 40 may be coupled to the front wall 114 or other walls of the map pocket insert 106 and still be within the scope of the invention. Moreover, the door trim assembly 130 may also include electric circuit 56, substantially similar to that described in detail above. As one or ordinary skill in the art will recognize, the map pocket insert 106 shown may be made by a molding process substantially similar that described above in reference to the embodiment shown in FIGS. 1 and 2 and illustrated in FIGS. 4A–4C.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. For example, those having ordinary skill in the art will recognize that the map pocket closeout 22, 80 or map pocket insert 106 of the present invention may equally be included in other automotive trim assemblies, e.g. instrument trim panels, rear passenger side panels, center consoles and others. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive interior trim assembly, comprising:
   a trim panel;
   a housing that forms at least a portion of a map pocket coupled to said trim panel to define a cavity having an opening, said cavity adapted to store one or more items therein; and
   an electroluminescent lamp integrally molded with said housing and adapted to illuminate said cavity.

2. The trim assembly of claim 1 further comprising:
   an electrical circuit for energizing said electroluminescent lamp.

3. The trim assembly of claim 2, wherein said electrical circuit comprises:
   a power source;
   a first electrical connector coupled to said housing and electrically coupled to said electroluminescent lamp; and
   a second electrical connector coupled to said trim panel and electrically coupled to said power source, wherein said first electrical connector is electrically coupled to said second electrical connector when said housing is coupled to said trim panel so as to energize said electroluminescent lamp.

4. The trim assembly of claim 2, further comprising:
   an electrical switch having a first position that energizes the electroluminescent lamp and a second position that de-energizes the electroluminescent lamp.

5. The trim assembly of claim 1 configured as a door trim assembly.

6. The trim assembly of claim 1, wherein said housing is configured as a map pocket closeout.

7. The trim assembly of claim 6, wherein said map pocket closeout is configured as a front load map pocket closeout.

8. The trim assembly of claim 6, wherein said map pocket closeout is configured as a rear load map pocket closeout.

9. The trim assembly of claim 1, wherein said housing is configured as a map pocket insert.

10. A method of forming an automotive interior trim assembly having a trim panel, comprising:
    inserting an electroluminescent lamp into a mold;
    forming a mold chamber about at least a portion of the electroluminescent lamp;
    molding a housing by injecting into the mold chamber a molten polymer resin to thereby also mold the housing to the electroluminescent lamp; and
    coupling the housing to the trim panel.

11. The method of claim 10, further comprising:
    molding an electrical connector to the housing during the molding operation.

12. The method of claim 10, wherein molding the housing further comprises:
    molding a map pocket closeout.

13. The method of claim 12, wherein coupling the housing to the trim panel further comprises:
    coupling the map pocket closeout to a front surface of the trim panel.

14. The method of claim 12, wherein coupling the housing to the trim panel further comprises:
    coupling the map pocket closeout to a back surface of the trim panel.

15. The method of claim 10, wherein molding the housing further comprises:
    molding a map pocket insert.

16. The method of claim 15, wherein coupling the housing to the trim panel further comprises:
    inserting the map pocket insert into an opening in the trim panel.

* * * * *

UNITED STATES PATENT AND TRADEMARK OFFICE
CERTIFICATE OF CORRECTION

PATENT NO. : 7,150,550 B2 Page 1 of 1
APPLICATION NO. : 10/711636
DATED : December 19, 2006
INVENTOR(S) : Bogdan Radu It is certified that error appears in the above-identified patent and that said Letters Patent is hereby corrected as shown below:

Title Page
Item [75] Inventors

"Radu Bogdan" should read --Bogdan Radu--

Item [12] should read -- Radu et al --.

Signed and Sealed this

Eighth Day of May, 2007

JON W. DUDAS
*Director of the United States Patent and Trademark Office*